US011234217B2

(12) United States Patent
Tang

(10) Patent No.: US 11,234,217 B2
(45) Date of Patent: Jan. 25, 2022

(54) DATA PROCESSING METHOD AND RELATED DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/621,231

(22) PCT Filed: Aug. 11, 2017

(86) PCT No.: PCT/CN2017/097170
§ 371 (c)(1),
(2) Date: Dec. 10, 2019

(87) PCT Pub. No.: WO2019/028859
PCT Pub. Date: Feb. 14, 2019

(65) Prior Publication Data
US 2020/0178214 A1     Jun. 4, 2020

(51) Int. Cl.
| H04W 4/00 | (2018.01) |
| H04W 72/02 | (2009.01) |
| H04W 4/46 | (2018.01) |
| H04W 72/12 | (2009.01) |
| H04W 92/18 | (2009.01) |

(52) U.S. Cl.
CPC ............ *H04W 72/02* (2013.01); *H04W 4/46* (2018.02); *H04W 72/1289* (2013.01); *H04W 92/18* (2013.01)

(58) Field of Classification Search
USPC ........................................ 370/329, 328, 330
See application file for complete search history.

(56) References Cited

U.S. PATENT DOCUMENTS

| 2013/0089063 A1* | 4/2013 | Yang ................. H04W 72/0413 370/329 |
| 2017/0019886 A1* | 1/2017 | Patel ....................... H04W 4/70 |
| 2018/0139724 A1* | 5/2018 | Loehr ................... H04W 72/02 |

(Continued)

FOREIGN PATENT DOCUMENTS

| CN | 106165510 A | 11/2016 |
| CN | 106688295 A | 5/2017 |

(Continued)

OTHER PUBLICATIONS

3GPPTSG-RAN WGI Meeting #89; Hangzhou, P.R.China, May 15-19, 2017; RI-1707106.

(Continued)

*Primary Examiner* — David Q Nguyen
(74) *Attorney, Agent, or Firm* — Young Basile Hanlon & MacFarlane, P.C.

(57) ABSTRACT

Disclosed in the present application are a data processing method and a related device. The method includes: a first user equipment receives control information from a second user equipment, the control information comprising indication information; the first user equipment determines, according to the indication information, a transmission mode of data scheduled by the control information.

8 Claims, 5 Drawing Sheets

(56) References Cited

U.S. PATENT DOCUMENTS

2020/0213975 A1* 7/2020 Chae ................. H04W 72/10
2020/0221271 A1* 7/2020 Kim ................. H04W 72/0446
2020/0383114 A1* 12/2020 Zhang ................. H04L 5/0096

FOREIGN PATENT DOCUMENTS

| CN | 106793092 A | 5/2017 | |
|----|----|----|----|
| EP | 3493450 A1 | 6/2019 | |
| EP | 3583814 A1 | 12/2019 | |
| WO | 2016165124 A1 | 10/2016 | |
| WO | WO-2018174630 A1 * | 9/2018 | ........... H04L 5/0053 |
| WO | 2018190617 A1 | 10/2018 | |

OTHER PUBLICATIONS

Extended European Search Report for EP Application 17921226.1 dated Jun. 16, 2020.
3GPP TSG-RAN WG1 #88bis; Apr. 3-7, 2017; Spokane, USA; R1-1705002.
3GPP TSG RAN WG1 Meeting #88bis; Spokane, USA, Apr. 3-7, 2017; R1-1704278.
3GPP TSG RAN WG1 Meeting #88bis; Spokane, USA Apr. 3-7, 2017; R1-1704529.
3GPP TSG RAN WG1 Meeting #88bis; Spokane, Washington, USA Apr. 3-7, 2017; R1-1704654.
3GPP TSG RAN WG1 Meeting #89; Hangzhou, China, May 15-19, 2017; R1-1707003.
3GPP TSG RAN WG1 Meeting #89; Hangzhou, P.R. China May 15-19, 2017; R1-1707214.
3GPP TSG RAN WG1 Meeting #88bis; Spokane, USA, Apr. 3-7, 2017; R1-1705788.
3GPP TSG RAN WG1 Meeting #89; Hangzhou, P.R. China May 15-19, 2017; R1-1707451.
3GPP TSG RAN WG1 Meeting #88bis; Spokane, USA Apr. 3-7, 2017; R1-1704842.
3GPP TSG RAN WG1 Meeting #89; Hangzhou, P.R. China May 15-19, 2017; R1-1707562.
Chile First Office Action with English Translation for CL Application 2020-000057 dated Mar. 17, 2021.
Communication pursuant to Article 94(3) EPC Examination for EP Application 17921226.1 dated Mar. 11, 2021.
India First Examination for EP Application 201917051794 dated May 31, 2021.
Communication pursuant to Article 94(3) EPC for EP Application 17921226.1 dated Sep. 28, 2021. (8 pages).
Chile Office Action with English Translation for CL Application 2020000057 dated Sep. 8, 2021. (18 pages).
3GPP TSG RAN WG1 Meeting #85 Nanjing, PRC, R1-165264, Ericsson, Contents of PSCCH for V2V over PC5, May 23-27, 2016 (4 pages).

* cited by examiner

DATA PROCESSING METHOD AND RELATED DEVICE

CROSS-REFERENCE TO RELATED APPLICATION(S)

This application is a 371 application of International Application No. PCT/CN2017/097170, filed on Aug. 11, 2017, the entire disclosure of which is hereby incorporated by reference.

TECHNICAL FIELD

The present application relates to a technical field of communications, in particular to a data processing method and a related device.

BACKGROUND

An Internet of Vehicle system is a Sidelink (SL) transmission technology based on Long Term Evolution (LTE)-Device to Device (D2D). Different from a traditional LTE system in which communication data is received or sent through a base station, the Internet of Vehicle system adopts a direct communication mode of a User Equipment (UE) to a UE, thus having higher spectral efficiency and lower transmission delay.

In the Internet of Vehicle system, data transmitted by the Sidelink adopts a transmission mode of control information+data, and the control information carries information associated with data transmission, such as a Modulation and Coding Scheme (MCS), time-frequency resource allocation information, resource reservation information, etc.

At present, transmission modes of a UE include a single antenna transmission mode and a transmit diversity mode, etc. The transmit diversity mode includes: a Space Frequency Block Code (SFBC), a Space Time Block Code (STBC), a Cyclic Delay Diversity (CDD), etc.

SUMMARY

Implementations of the present application provide a data processing method and a related device, for a user equipment to identify a transmission mode of data transmission.

In a first aspect, an implementation of the present application provides a data processing method. The method includes: a first user equipment receives control information from a second user equipment, wherein the control information includes indication information; and the first user equipment determines a transmission mode of data scheduled by the control information according to the indication information.

In a second aspect, an implementation of the present application provides a data processing method. The method includes: a second user equipment configures control information, wherein the control information is used for determining a transmission mode of data scheduled by the control information; and the second user equipment sends the control information to a first user equipment.

In a third aspect, a user equipment of an implementation of the present application is applied to a communication system including a first user equipment and a second user equipment, and the user equipment is the first user equipment which includes a communication unit and a processing unit. Herein, the processing unit is used for receiving control information from the second user equipment through the communication unit, wherein the control information includes indication information; and determining a transmission mode of data scheduled by the control information according to the indication information.

In a fourth aspect, a user equipment of an implementation of the present application is applied to a communication system including a first user equipment and a second user equipment, and the user equipment is the second user equipment which includes a communication unit and a processing unit. Herein, the processing unit is used for configuring control information, wherein the control information includes indication information, and the indication information is used for determining a transmission mode of data scheduled by the control information; and sending the control information to the first user equipment through the communication unit.

In a fifth aspect, an implementation of the present application provides a user equipment including one or more processors, one or more memories, one or more transceivers, and one or more programs. The one or more programs are stored in the one or more memories and configured to be executed by the one or more processors. The one or more programs include instructions for executing acts in the method as described in the first aspect.

In a sixth aspect, an implementation of the present application provides a user equipment including one or more processors, one or more memories, one or more transceivers, and one or more programs. The one or more programs are stored in the one or more memories and configured to be executed by the one or more processors. The one or more programs include instructions for executing acts in the method as described in the second aspect.

In a seventh aspect, an implementation of the present application provides a computer readable storage medium storing a computer program for electronic data interchange. The computer program enables a computer to execute the method as described in the first aspect.

In an eighth aspect, an implementation of the present application provides a computer readable storage medium storing a computer program for electronic data interchange. The computer program enables a computer to execute the method as described in the second aspect.

In a ninth aspect, an implementation of the present application provides a computer program product. The computer program product includes a non-transitory computer readable storage medium storing a computer program, and the computer program is operable to enable a computer to execute the method as described in the first aspect.

In a tenth aspect, an implementation of the present application provides a computer program product. The computer program product includes a non-transitory computer readable storage medium storing a computer program, and the computer program is operable to enable a computer to execute the method as described in the second aspect.

These aspects and other aspects of the present application will be more easily understood from following description of the implementations.

BRIEF DESCRIPTION OF DRAWINGS

To describe technical solutions of implementations of the present application or prior art more clearly, accompanying drawings that need to be used in the description of implementations or the prior art will be briefly introduced below. It is apparent that the accompanying drawings described below are only some implementations of the present application; and for a person of ordinary skill in the art, other drawings may be acquired according to these drawings without paying an inventive effort.

DETAILED DESCRIPTION

To enable one skilled in the art to better understand solutions of the present application, technical solutions in implementations of the present application will be described clearly and completely below with reference to drawings in the implementations of the present application. Apparently, the described implementations are only part, but not all, of the implementations of the present application. According to the implementations of the present application, all other implementations acquired by a person having ordinary skill in the art without paying an inventive effort are within the protection scope of the present application.

Details are given below respectively.

Terms "first", "second", "third" and "fourth", or the like in the specification, claims and drawings of the present application are used to distinguish different objects but not used to describe a specific order. In addition, terms "include" and "have" and any variations thereof are intended to cover non-exclusive inclusion. For example, a process, a method, a system, a product, or a device that includes a series of acts or units is not limited to the listed acts or units, but optionally further includes acts or units that are not listed, or optionally further includes other acts or units that are inherent to the process, the method, the product, or the device.

The phrase "implementation" mentioned in this document means that a particular feature, a structure, or a characteristic described in combination with the implementation may be included in at least one implementation of the present application. The appearance of the phrase in various places in the specification does not necessarily refer to the same implementation, nor is it an independent or alternative implementation mutually exclusive with other implementations. It is explicitly and implicitly understood by one skilled in the art that implementations described in this document may be combined with other implementations.

Implementations of the present application will be described below with reference to the accompanying drawings.

Figure 1:
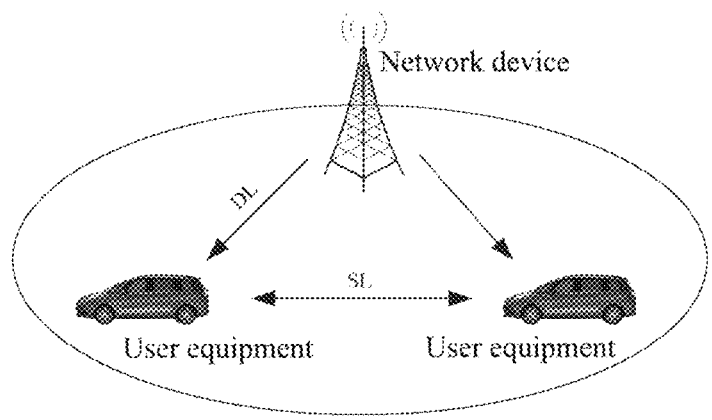
FIG. 1 is a schematic diagram of a network architecture of mode 3 provided by an implementation of the present application.
Figure 2:
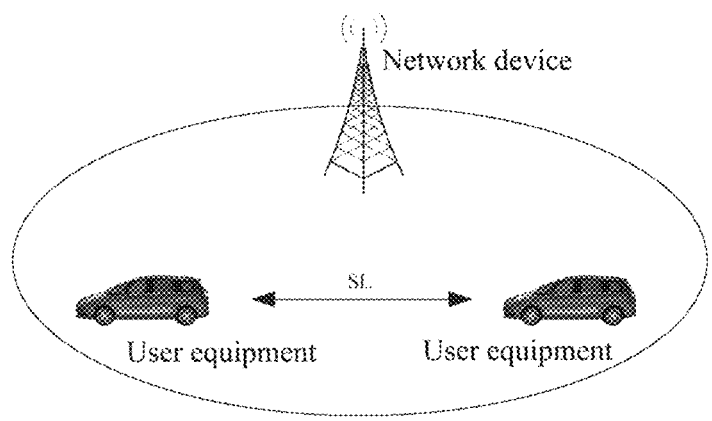
FIG. 2 is a schematic diagram of a network architecture of mode 4 provided by an implementation of the present application.

In 3rd Generation Partnership Project (3GPP) Rel-14, a Vehicle to Vehicle (V2V) technology is standardized, and two transmission modes are defined as mode 3 and mode 4. A network architecture diagram of the mode 3 is shown in FIG. 1. In mode 3, a transmission resource of a user equipment (e.g. a vehicle-mounted terminal) is allocated by a network device, and the user equipment sends data on a Sidelink according to the resource allocated by the network device. The network device may allocate a resource for a single transmission to the user equipment, or may allocate a resource for semi-static transmission to the user equipment. A network architecture diagram of the mode 4 is shown in FIG. 2. In mode 4, a user equipment (e.g. a vehicle-mounted terminal) adopts a transmission mode of sensing+reservation. The user equipment acquires a set of available transmission resources in a resource pool by sensing, and randomly selects a resource from the set for data transmission. As services in the Internet of Vehicle system have a periodic characteristic, the user equipment usually adopts a semi-static transmission mode, that is, after selecting a transmission resource, the user equipment will continuously use the resource in multiple transmission periods, thus reducing probabilities of resource re-selection and resource conflict. The user equipment carries information about a resource reserved for a next transmission in control information for a current transmission, so that other user equipment may determine whether the resource is reserved and used by the user equipment by detecting the control information of the user equipment, thus achieving a purpose of reducing resource conflicts.

In the Internet of Vehicle system, data transmitted by a Sidelink adopts a transmission mode of control information (SCI)+data, and the control information carries information associated with data transmission, such as a Modulation and Coding Scheme (MCS), time-frequency resource allocation information, resource reservation information, etc. A data receiving end acquires the time-frequency resource position, reserved information, etc. of the data by detecting the control information, to determine whether the resource is available.

In Rel-14, a sending end device uses a single antenna transmission mode to send data, while in Rel-15, a sending end device uses a transmit diversity transmission mode to send data, such as SFBC, STBC, CDD, etc. If a user equipment of Rel-14 and a user equipment of Rel-15 are in the same resource pool, then the user equipment of Rel-14 is required to be capable of detecting control information of Rel-15 to acquire a resource occupation situation about the user equipment of Rel-15. In this case, the user equipment of Rel-15 is required to be capable of identifying whether detected control information is from Rel-14 or from Rel-15, so that the user equipment of Rel-15 may receive data in a corresponding receiving mode. For example, if control information is sent by a user equipment of Rel-14, then a user equipment of Rel-15 receives data in a receiving mode of single antenna transmission, and if control information is sent by a user equipment of Rel-15, then the user equipment of Rel-15 receives data in a receiving mode of transmit diversity.

To solve the above-mentioned problems, in the present solution, firstly, a sending end device (i.e. a second user equipment) configures control information, wherein the control information includes indication information, the indication information is used for determining a transmission mode of data scheduled by the control information, wherein the control information can be detected by a user equipment of Rel-14 and a user equipment of Rel-15. Then the sending end device sends the control information to a receiving end device (i.e. a first user equipment). Subsequently the receiving end device receives the control information sent from the sending end device. Finally, the receiving end device identifies the transmission mode of the data scheduled by the control information according to the indication information included in the control information.

It can be seen that the present solution provides control information that may be detected by both a user equipment of Rel-14 and a user equipment of Rel-15, thus avoiding a situation that the user equipment of Rel-14 cannot detect control information of Rel-15 or the user equipment of Rel-15 cannot identify whether received control information is from the user equipment of Rel-14 or from the user equipment of Rel-15 when the user equipment of Rel-14 and the user equipment of Rel-15 are in the same resource pool. In addition, the control information further includes indication for indicating a transmission mode for data scheduled by the control information, so that the receiving end device can identify the transmission mode of the data scheduled by the control information through the control information and receive the data according to a corresponding receiving algorithm.

The user equipment is a device that provides voice and/or data connectivity to a user, such as a handheld device and a vehicle-mounted device with a wireless connection function. A common user equipment includes, for example, a mobile phone, a tablet computer, a notebook computer, a palm computer, a mobile internet device (MID), a wearable device such as a smart watch, a smart bracelet, a pedometer, etc.

The network device is a node device at a network side. For example, the network device may be a Radio Access Network (RAN) device at an access network side in a cellular network. The so-called RAN device is a device that connects a user equipment to a wireless network, including but not limited to: an Evolved Node B (eNB), a radio network controller (RNC), a Node B (NB), a Base Station Controller (BSC), a Base Transceiver Station (BTS), a Home Base Station (e.g., a Home evolved NodeB, or a Home Node B, HNB), a BaseBand Unit (BBU), or a Mobility Management Unit (MME). For another example, the network device may be a node device in a Wireless Local Area Network (WLAN), such as an access controller (AC), a gateway, or a WIFI Access Point (AP).

Below, a data processing method provided by an implementation of the present application will be described in detail with reference to the network architecture shown in FIG. 1 and FIG. 2.

Figure 3:
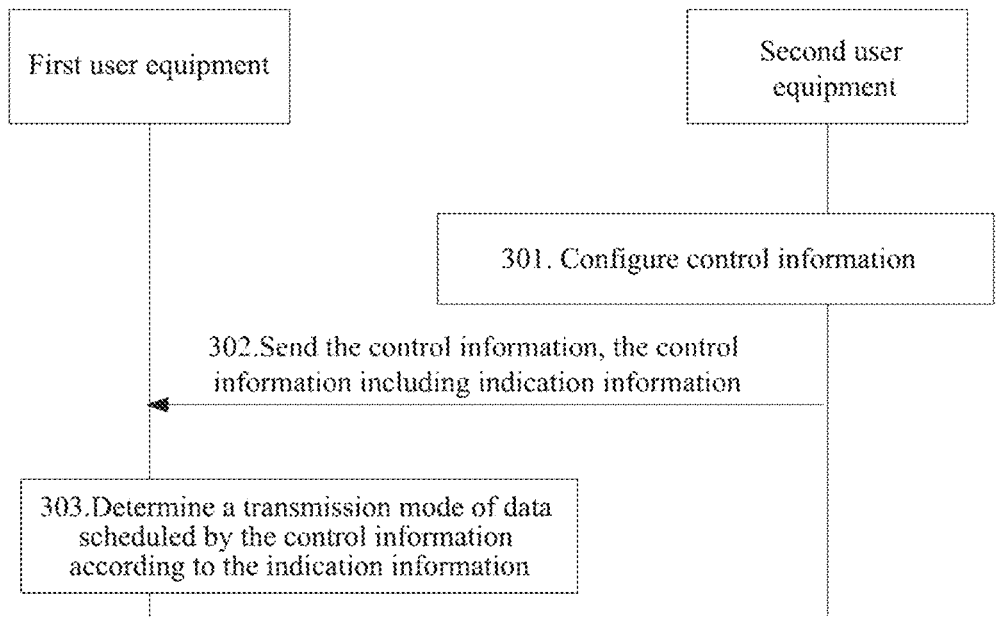
FIG. 3 is a schematic flowchart of a data processing method provided by an implementation of the present application.

Refer to FIG. 3 which is a schematic flowchart of a data processing method provided by an implementation of the present application. The method includes acts 301-303.

In act 301, a second user equipment configures control information, wherein the control information includes indication information, and the indication information is used for determining a transmission mode of data scheduled by the control information.

In act 302, the second user equipment sends the control information to a first user equipment.

In act 303, the first user equipment receives the control information from the second user equipment, and the first user equipment determines the transmission mode of the data scheduled by the control information according to the indication information.

The control information includes a MCS, time-frequency resource allocation information, resource reservation information or the like, besides the indication information.

And the control information can be detected by a user equipment of Rel-14 and a user equipment of Rel-15.

For example, assuming that the first user equipment and the second user equipment adopt the transmission mode of the mode 4 shown in FIG. 2, the first user equipment is a user equipment 1 of Rel-15, and the second user equipment is a user equipment 2 of Rel-15. The user equipment 2 of Rel-15 acquires an available transmission resource set in a resource pool by sensing, and the user equipment 2 of Rel-15 randomly selects a resource for data transmission from the transmission resource set. As in the Internet of Vehicle system data transmitted by a Sidelink adopts a transmission mode of control information+data, before data transmission, the user equipment 2 of Rel-15 configures control information. The configured control information includes information associated with data transmission, such as indication information, and the indication information is used for indicating a transmission mode (such as SFBC) for the user equipment 2 of Rel-15 to transmit data. The control information further includes a MCS of the user equipment 2 of Rel-15, time-frequency resource allocation information about a resource used for transmitting data by the user equipment 2 of Rel-15, resource reservation information about resource reservation of the user equipment 2 of Rel-15. The user equipment 2 of Rel-15 transmits the configured control information and data in the selected resource. As the control information transmitted by the user equipment 2 of Rel-15 can be detected by the user equipment of Rel-14 and the user equipment of Rel-15, after detecting the control information transmitted by the user equipment 2 of Rel-15, the user equipment 1 of Rel-15 may know that data scheduled by the control information is sent with the SFBC transmission mode by a user equipment of Rel-15, then the user equipment 1 of Rel-15 may receive the data according to the SFBC transmission mode.

For another example, assuming that the first user equipment and the second user equipment adopt the transmission mode of the mode 4 shown in FIG. 2, the first user equipment is a user equipment of Rel-14, and the second user equipment is a user equipment of Rel-15. The user equipment of Rel-15 acquires an available transmission resource set in a resource pool by sensing, and the user equipment of Rel-15 randomly selects a resource for data transmission from the transmission resource set. As in the Internet of Vehicle system, data transmitted by a Sidelink adopts a transmission mode of control information+data, before data transmission, the user equipment of Rel-15 configures control information. The configured control information includes information associated with data transmission, such as indication information, the indication information is used for indicating a transmission mode for the user equipment of Rel-15 to transmit data (assuming that the user equipment of Rel-15 sends data to the user equipment of Rel-14, the transmission mode for the user equipment of Rel-15 to transmit the data is a single antenna transmission mode). The control information further includes a MCS of the user equipment of Rel-15, time-frequency resource allocation information about a resource used for transmitting data by the user equipment of Rel-15, resource reservation information about resource reservation of the user equipment of Rel-15. The user equipment of Rel-15 transmits the configured control information and data in the selected resource. As the control information transmitted by the user equipment of Rel-15 can be detected by the user equipment of Rel-14 and the user equipment of Rel-15, after detecting the control information transmitted by the user equipment of Rel-15, the user equipment of Rel-14 may know a resource occupation situation about the user equipment of Rel-15, and receive data according to the single antenna transmission mode.

It can be seen that the present solution provides control information that may be detected by both a user equipment of Rel-14 and a user equipment of Rel-15, thus avoiding a situation that the user equipment of Rel-14 cannot detect the control information of Rel-15 or the user equipment of Rel-15 cannot identify whether received control information is from the user equipment of Rel-14 or from the user equipment of Rel-15 when the user equipment of Rel-14 and the user equipment of Rel-15 are in the same resource pool. In addition, the control information further includes indication for indicating a transmission mode for data scheduled by the control information, so that the receiving end device can identify the transmission mode of the data scheduled by the control information through the control information and receive the data according to a corresponding receiving algorithm.

In an example, the control information includes Sidelink Control Information (SCI) format 1.

Further, the indication information is defined by using a specific bit in the SCI, for example, the specific bit is a reserved bit in the SCI format 1.

As a user equipment of Rel-14 may only detect control information of Rel-14 (such as SCI format 1), if a user equipment of Rel-15 uses newly defined control information, the user equipment of Rel-14 may be incapable of detecting the newly defined control information. Therefore, in the present solution, control information transmitted by the user equipment of Rel-15 multiplexes the control information of Rel-14, that is, the control information transmitted by the user equipment of Rel-14 uses the SCI format 1, and the control information transmitted by the user equipment of Rel-15 also uses the SCI format 1. In addition, as the user equipment of Rel-14 and the user equipment of Rel-15 use different transmission modes to transmit data, to enable a receiving end device to correctly receive data transmitted by a sending end device, which transmission mode is used by the sending end device to transmit data is indicated to the receiving end device, and in a specific implementation in the present solution, a reserved bit in the SCI format 1 is used for indication.

Further, when the second user equipment supports at least one transmit diversity mode, the indication information is defined by using at least one specific bit in the SCI, for example, the specific bit is a reserved bit in the SCI format 1.

In the SCI format 1 there are multiple reserved bits. In Rel-14, these reserved bits of the SCI format 1 are all set to 0. When a user equipment of Rel-15 multiplexes the SCI format 1, in the present solution at least one reserved bit in the SCI format 1 is used for indicating the transmission mode to distinguish transmission modes of the user equipment of Rel-14 and the user equipment of Rel-15.

Further, a value of the specific bit is used for determining the transmission mode of data scheduled by the control information. Determining, by the first user equipment, the transmission mode of data scheduled by the control information according to the indication information, includes: the first user equipment determines the transmission mode of data scheduled by the control information according to the value of the specific bit.

For example, assuming that the specific bit is a reserved bit in the SCI format 1, and only one transmit diversity transmission mode is defined in Rel-15, such as SFBC, then the second user equipment may use the one reserved bit in the SCI format 1 to indicate the transmission mode. For example, when the value of the reserved bit is 1, it indicates the transmission mode of SFBC is used, and when the value of the reserved bit is 0, it indicates the single antenna transmission mode in Rel-14 is used. For a user equipment of Rel-14, as the user equipment of Rel-14 cannot analyze information about the reserved bit, the reserved bit is set to 0 by default, and then the determined transmission mode for the user equipment of Rel-14 is always the single antenna transmission mode, and a user equipment of Rel-14 may receive data in the single antenna mode later. For a user equipment of Rel-15, as the user equipment of Rel-15 may correctly analyze information about the reserved bit, the user equipment of Rel-15 may receive data according to the transmission mode indicated by the reserved bit.

For another example, assuming that the specific bit is a reserved bit in the SCI format 1, and more than one transmit diversity transmission mode (such as SFBC and STBC) is defined in Rel-15, then the second user equipment may use two reserved bits in the SCI format 1 to indicate the transmission mode. For example, when the value of the two reserved bits is 01, it indicates that the SFBC transmission mode is used, when the value of the two reserved bits is 10, it indicates the STBC transmission mode is used, and when the value of the two reserved bits is 00, it indicates the single antenna transmission mode of Rel-14 is used. For a user equipment of Rel-14, as the user equipment of Rel-14 cannot analyze information about the two reserved bits and the value of the two reserved bits is set to 0 by default, the determined transmission mode for the user equipment of Rel-14 is always the single antenna transmission mode, and the user equipment of Rel-14 may receive data in the single antenna mode later. For the user equipment of Rel-15, as the user equipment of Rel-15 may correctly analyze information about the two reserved bits, the user equipment of Rel-15 may receive data according to the transmission mode indicated by the reserved bits.

In an example, the indication information is a mask sequence, and the mask sequence is used for indicating a transmission mode of data scheduled by the control information; and determining, by the first user equipment, the transmission mode of data scheduled by the control information according to the indication information, includes: the first user equipment determines the transmission mode of data scheduled by the control information according to the mask sequence.

Receiving, by the first user equipment, control information from the second user equipment, includes: the first user equipment receives a Physical Sidelink Control Channel (PSCCH) sent by the second user equipment, wherein the PSCCH carries SCI and the mask sequence, then the control information includes the SCI and the mask sequence, and the indication information includes the mask sequence, wherein the mask sequence is used for indicating the transmission mode of data scheduled by the control information. After adding Cyclical Redundancy Check (CRC) to the SCI information, different mask sequences may be used for indicating transmission modes of data scheduled by the control information. For example, if Rel-15 supports only one transmission diversity scheme, such as SFBC, the mask sequences shown in Table 1 are used for indicating transmission modes adopted for data scheduled by the control information.

TABLE 1

| Mask sequence $\langle x_{mask,0}, x_{mask,1}, \ldots, x_{mask,15} \rangle$ | Transmission mode |
|---|---|
| <0, 0, 0, 0, 0, 0, 0, 0, 0, 0, 0, 0, 0, 0, 0, 0> | Single antenna transmission |
| <0, 0, 0, 0, 0, 0, 0, 0, 0, 0, 0, 0, 0, 0, 0, 1> | Transmit diversity (e.g. SFBC) |

For another example, if Rel-15 supports multiple transmit diversity modes, such as SFBC and STBC, the mask sequences shown in Table 2 are used for indicating transmission modes adopted for data scheduled by the control information.

TABLE 2

| Mask sequence $\langle x_{mask,0}, x_{mask,1}, \ldots, x_{mask,15} \rangle$ | Transmission mode |
|---|---|
| <0, 0, 0, 0, 0, 0, 0, 0, 0, 0, 0, 0, 0, 0, 0, 0> | Single antenna transmission |
| <0, 1, 0, 1, 0, 1, 0, 1, 0, 1, 0, 1, 0, 1, 0, 1> | SFBC |
| <1, 0, 1, 0, 1, 0, 1, 0, 1, 0, 1, 0, 1, 0, 1, 0> | STBC |

It should be noted that specific mask sequences are not limited in the present solution, and other mask sequences may be used to distinguish different time slots.

Information bits of SCI may be represented as: $a_0, a_1, a_2, a_3, \ldots, a_{A-1}$, CRC check bits may be represented as $p_0, p_1, p_2, p_3, \ldots, p_{L-1}$, wherein A represents a length of the information bits and L represents a length of the check bits. A bit sequence in which the CRC is added is represented as $b_0, b_1, b_2, b_3, \ldots, b_{B-1}$, wherein B=A+L, $b_k = a_k$ for $k=0,1,2,\ldots,A-1$ $b_k = p_{k-A}$ for $k=A, A+1, A+2, \ldots, A+L-1$.

A mask adding processing is performed on the sequence in which the CRC is added, and the mask is as the mask sequence $x_{mask}$ given in the above implementation, and the sequence on which the mask adding processing is performed is $c_0, c_1, c_2, c_3, \ldots, c_{B-1}$, wherein, $c_k = b_k$ for $k=0,1,2,\ldots,A-1$ $c_k = (b_k + x_{mask,k-A}) \mod 2$ for $k=A, A+1, A+2, \ldots, A+15$ It should be noted that a specific operation of adding a mask sequence is not limited in present solution, and the operation of adding the mask sequence may be implemented in other ways.

Figure 4:
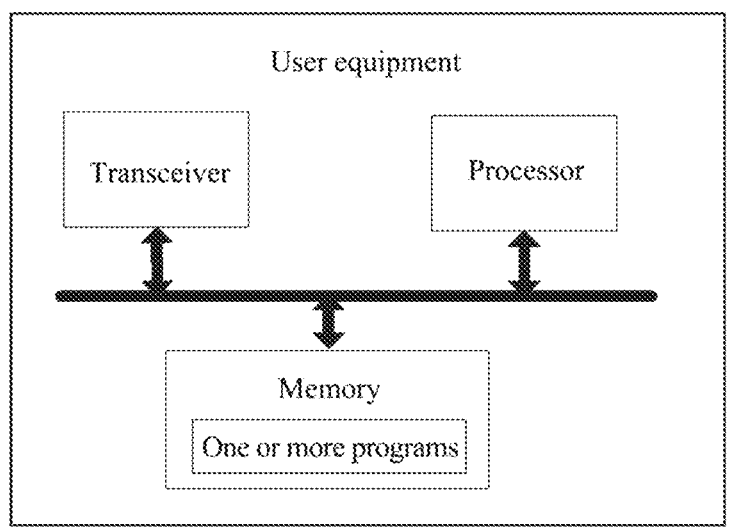
FIG. 4 is a schematic structural diagram of a user equipment provided by an implementation of the present application.

Consistent with the above implementation shown in FIG. 3, refer to FIG. 4 which is a schematic structural diagram of a user equipment provided by an implementation of the present application. As shown in the figure, the user equipment is the first user equipment described in the above method, and the user equipment includes one or more processors, one or more memories, one or more transceivers, and one or more programs. Herein the one or more programs are stored in the one or more memories and configured to be executed by the one or more processors, and the one or more programs include instructions for performing the following acts: receiving control information from a second user equipment, wherein the control information includes indication information; and determining a transmission mode of data scheduled by the control information according to the indication information.

In an example, the control information includes SCI, and the indication information is defined by using a specific bit in the SCI.

In an example, when the second user equipment supports at least one transmit diversity mode, the indication information is defined by using at least one specific bit in the SCI.

In an example, in an aspect of determining the transmission mode of data scheduled by the control information according to the indication information, the one or more programs include instructions for performing the following acts: determining the transmission mode of data scheduled by the control information according to a value of the specific bit.

In an example, the indication information includes a mask sequence, and in an aspect of determining the transmission mode of data scheduled by the control information according to the indication information, the one or more programs include instructions for performing the following acts: determining the transmission mode of data scheduled by the control information according to the mask sequence.

It should be noted that specific implementations of contents described in the implementation may refer to the above method and will not be described repeatedly herein.

Figure 5:
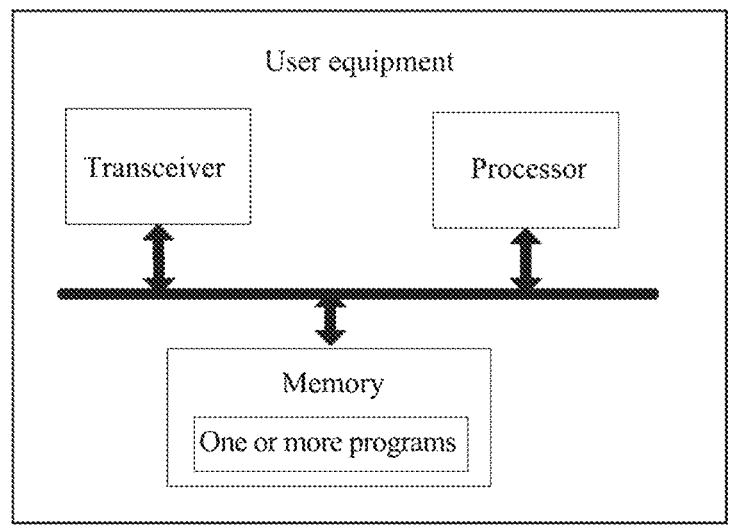
FIG. 5 is a schematic structural diagram of another user equipment provided by an implementation of the present application.

Consistent with the above implementation shown in FIG. 3, refer to FIG. 5 which is a structural diagram of another user equipment provided by an implementation of the present application. As shown in the figure, the user equipment is the second user equipment described in the above method, and the user equipment includes one or more processors, one or more memories, one or more transceivers, and one or more programs. Herein, the one or more programs are stored in the one or more memories and configured to be executed by the one or more processors, and the one or more programs include instructions for performing the following acts: configuring control information, wherein the control information includes indication information for determining a transmission mode of data scheduled by the control information; and sending the control information to a first user equipment.

In an example, the control information includes SCI, and the indication information is defined by using a specific bit in the SCI.

In an example, when the second user equipment supports at least one transmit diversity mode, the indication information is defined by using at least one specific bit in the SCI.

In an example, a value of the specific bit is used for determining the transmission mode of data scheduled by the control information.

In an example, the indication information includes a mask sequence, and the mask sequence is used for determining the transmission mode of data scheduled by the control information.

It should be noted that specific implementations of contents described in the implementation may refer to the above method and will not be described repeatedly herein.

The foregoing describes the solution provided in implementations of the present application mainly from a perspective of interaction between network elements. It can be understood that the first user equipment and the second user equipment include corresponding hardware structures and/or software modules for performing various functions, to implement the foregoing functions. A person skilled in the art should easily recognize that, in combination with units and algorithm acts of examples described in the implementations disclosed in this document, the present application may be implemented by hardware or a combination of hardware and computer software. Whether a function is performed by hardware or computer software driving hardware depends on a particular application and a design constraint condition of the technical solution. Skilled in the art may use different approaches to implement the described functions for each particular application, but such implementation should not be considered to be beyond the scope of the present application.

Division of functional units may be performed on the first user equipment and the second user equipment in implementations of the present application according to the above method examples. For example, various functional units may be divided to correspond to various functions, or two or more functions may be integrated into one processing unit. The integrated unit may be implemented in a form of hardware, or may be implemented in a form of a software program module. It should be noted that, the division for the units in implementations of the present application is example, and is merely a logical functional division. There may be other divisions in an actual realization.

Figure 6:
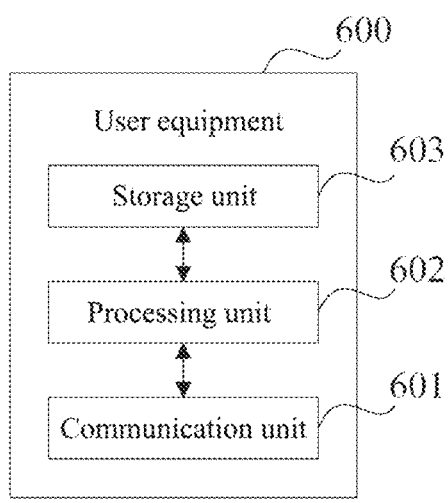
FIG. 6 is a schematic structural diagram of another user equipment provided by an implementation of the present application.

In a case of using integrated units or modules, FIG. 6 shows a possible functional unit composition block diagram of a user equipment involved in above implementations, and the user equipment shown in FIG. 6 is the first user equipment described above. The user equipment 600 includes a processing unit 602, a communication unit 601, and a storage unit 603. The processing unit 602 is used for controlling and managing the actions of the user equipment. The communication unit 601 is used for supporting communication between the user equipment and other equipment. The storage unit 603 is used for storing program codes and data of the user equipment. It should be noted that the processing unit 602, the communication unit 601, and the storage unit 603 are used for supporting to perform acts of the above method, and will not be described repeatedly herein.

The processing unit 602 may be a processor or a controller such as a Central Processing Unit (CPU), a general purpose processor, a Digital Signal Processor (DSP), an Application-Specific Integrated Circuit (ASIC), a Field Programmable Gate Array (FPGA), or other programmable logic device, a transistor logic device, a hardware component, or any combination thereof. The processing unit may implement or execute various illustrative logical blocks, modules, and circuits described in connection with disclosure of the present application. The processor may further be a combination for implementing computing functions, e.g., may include a combination including one or more microprocessors, a combination of a DSP and a microprocessor, or the like. The communication unit 601 may be a transceiver, a transceiving circuit, or a radio frequency chip, or the like. The storage unit 603 may be a memory.

When the processing unit 602 is a processor, the communication unit 601 is a communication interface, and the storage unit 603 is a memory, the user equipment involved in the implementation of the present application may be the user equipment shown in FIG. 4.

Figure 7:
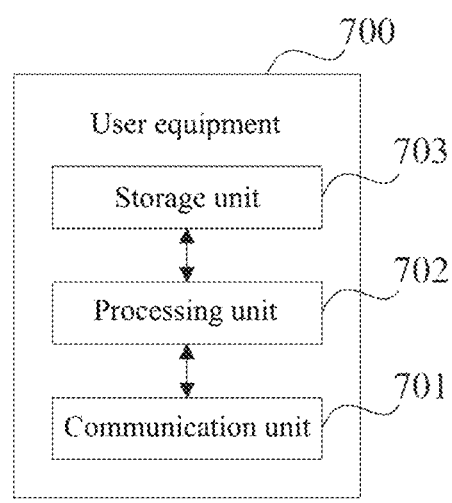
FIG. 7 is a schematic structural diagram of another user equipment provided by an implementation of the present application.

In a case of using integrated units or modules, FIG. 7 shows a possible functional unit composition block diagram of a user equipment involved in above implementations, and the user equipment shown in FIG. 7 is the second user equipment mentioned above. The user equipment 700 includes a processing unit 702, a communication unit 701, and a storage unit 703. The processing unit 702 is used for controlling and managing the actions of the user equipment. The communication unit 701 is used for supporting communication between the user equipment and other equipment. The storage unit 703 is used for storing program codes and data of the user equipment. It should be noted that the processing unit 702, the communication unit 701, and the storage unit 703 are used for supporting to perform the acts of the above method, and will not be described repeatedly here.

The processing unit 702 may be a processor or a controller such as a Central Processing Unit (CPU), a general purpose processor, a Digital Signal Processor (DSP), an Application-Specific Integrated Circuit (ASIC), a Field Programmable Gate Array (FPGA), or other programmable logic device, a transistor logic device, a hardware component, or any combination thereof. The processing unit may implement or execute various illustrative logical blocks, modules, and circuits described in connection with disclosure of the present application. The processor may further be a combination for implementing computing functions, e.g., may include a combination including one or more microprocessors, a combination of a DSP and a microprocessor, or the like. The communication unit 701 may be a transceiver, a transceiving circuit, or a radio frequency chip, or the like. The storage unit 703 may be a memory.

When the processing unit 702 is a processor, the communication unit 701 is a communication interface, and the storage unit 703 is a memory, the user equipment involved in the implementation of the present application may be the user equipment shown in FIG. 5.

Figure 8:
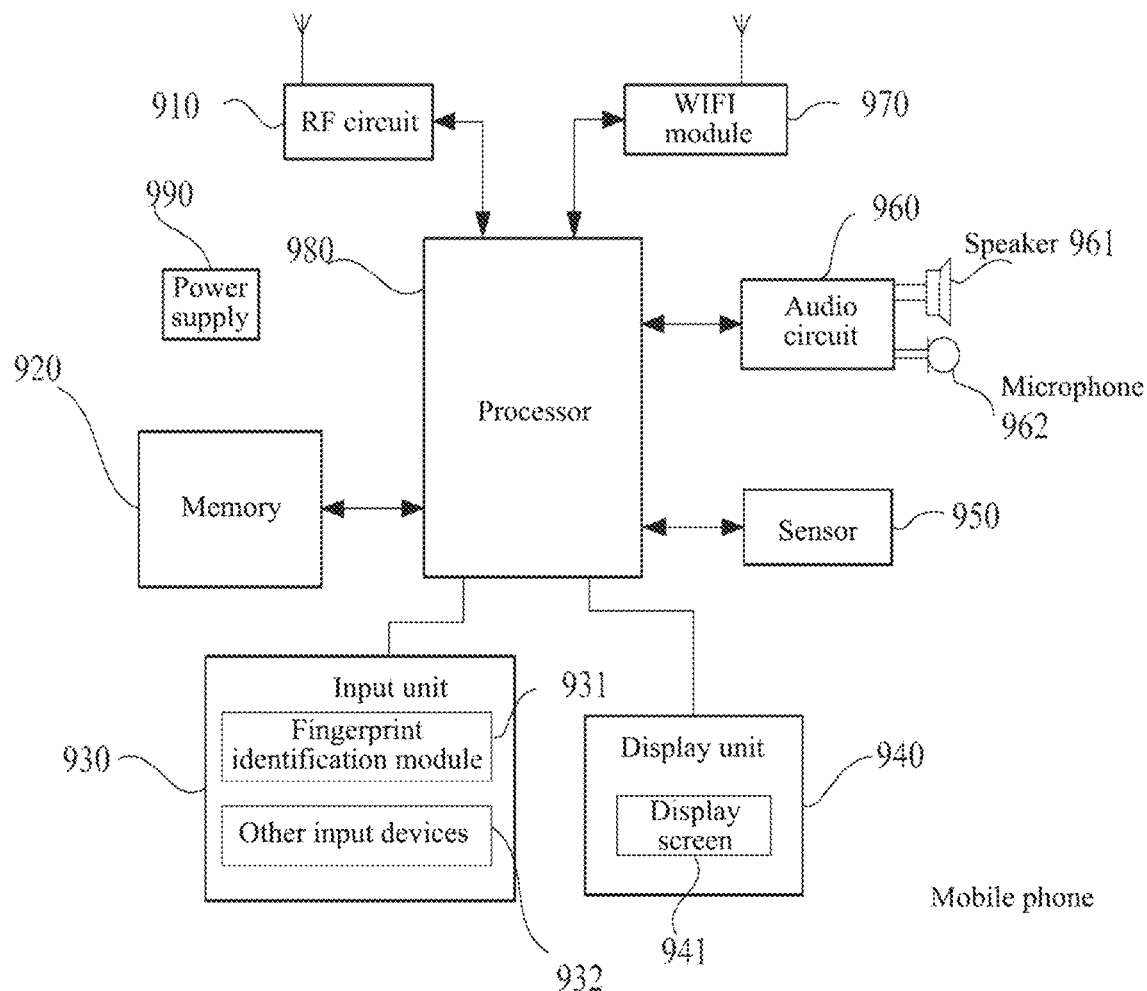
FIG. 8 is a schematic structural diagram of another user equipment provided by an implementation of the present application.

Another user equipment is further provided in an implementation of the present application. As shown in FIG. 8, for ease of illustration, only parts related to implementations of the present application are shown, and specific technical details which are not illustrated may refer to method implementations of the present application. The user equipment may be a mobile phone, a tablet computer, a Personal Digital Assistant (PDA), a Point of Sales (POS), a vehicle-mounted computer, or any other user device.

A mobile phone is taken as an example of the user equipment. FIG. 8 is a block diagram of partial structure of a mobile phone related to the user equipment provided by implementations of the present application. Referring to FIG. 8, the mobile phone includes a radio frequency (RF) circuit 910, a memory 920, an input unit 930, a display unit 940, a sensor 950, an audio circuit 960, a wireless fidelity (WiFi) module 970, a processor 980, and a power supply 990, etc. A person skilled in the art may understand that the structure of the mobile phone shown in FIG. 8 does not constitute a limitation to the mobile phone, and the mobile phone may include more parts or fewer parts than those shown in the figure, or may include some combined parts, or a different part arrangement.

Below, various composition parts of the mobile phone are described with reference to FIG. 8.

The RF circuit 910 may be used for receiving and sending information. Generally, the RF circuit 910 includes, but is not limited to, an antenna, at least one amplifier, a transceiver, a coupler, a Low Noise Amplifier (LNA), a duplexer, and the like. In addition, the RF circuit 910 may further communicate with a network and other devices via wireless communication. The wireless communication may use any communication standard or protocol, which includes, but is not limited to, a Global System of Mobile Communication (GSM), a General Packet Radio Service (GPRS), a Code Division Multiple Access (CDMA), a Wideband Code Division Multiple Access (WCDMA), a Long Term Evolution (LTE), an e-mail, a Short Messaging Service (SMS), and the like.

The memory 920 may be used for storing software programs and modules. The processor 980 runs the software programs and modules stored in the memory 920 to execute various functional applications and data processing of the mobile phone. The memory 920 may mainly include a program storage area and a data storage area. The program storage area may store an operating system, an application program required for at least one function, and the like. The data storage area may store data or the like created according to usage of the mobile phone. In addition, the memory 920 may include a high speed random access memory, and also include a non-volatile memory, such as at least one magnetic disk storage device, a flash memory, or other volatile solid-state storage device.

The input unit 930 may be used for receiving input digital or character information, and generating key signal inputs related to user settings and function control of the mobile phone. The input unit 930 may include a fingerprint identification module 931 and other input devices 932. The fingerprint identification module 931 may collect fingerprint data inputted by a user thereon. Besides the fingerprint identification module 931, the input unit 930 may further include other input devices 932. The other input devices 932 may include, but are not limited to, one or more of a touch control screen, a physical keyboard, a function key (for example, a volume control key, or a power key), a track ball, a mouse, a joystick, and so on.

The display unit 940 may be used for displaying information input by a user or information provided for the user, and various menus of the mobile phone. The display unit 940 may include a display screen 941. Optionally, the display screen 941 may be configured by a Liquid Crystal Display (LCD), an Organic Light-Emitting Diode (OLED), or the like. Although the fingerprint identification module 931 and the display screen 941 in FIG. 8 are used as two separate parts to realize the input and input function of the mobile phone, in some implementations, the fingerprint identification module 931 and the display screen 941 may be integrated to realize the input function and playing function of the mobile phone.

The mobile phone may further include at least one sensor 950, such as an optical sensor, a motion sensor or other sensor. The optical sensor may include an ambient light sensor and a proximity sensor. The ambient light sensor may adjust the luminance of the display screen 941 according to brightness of the ambient light, and the proximity sensor may turn off the display screen 941 and/or backlight when the mobile phone is moved near an ear. As one type of the motion sensor, an acceleration sensor may detect magnitudes of accelerations in various directions (generally tri-axiality), may detect the magnitude and direction of the gravity when the sensor is still, may be used in an application for identifying a gesture of the mobile phone (for example, switching between landscape and portrait, related games, and gesture calibration of a magnetometer), and a function related to vibration identification (such as a pedometer and a tap). Other sensors, for example, a gyroscope, a barometer, a hygrometer, a thermometer, and an infrared sensor, which may be configured in the mobile phone are not further described repeatedly herein.

An audio circuit 960, a speaker 961, and a microphone 962 may provide audio interfaces between a user and the mobile phone. The audio circuit 960 may transmit electrical signals converted from received audio data to the speaker 961, and the speaker 961 may convert the electrical signals into sound signals for playing. On the other hand, the microphone 962 converts collected sound signals into electrical signals, and the electrical signals are received by the audio circuit 960 and then converted into audio data. After processed by the processor 980, the audio data is sent to, for example, another mobile phone via the RF circuit 910, or the audio data is played to the memory 920 for further processing.

WiFi is a short-range wireless transmission technology. The mobile phone may help a user to send and receive e-mails, browse web pages and access streaming media and the like through WiFi module 970. The WiFi module 970 provides a user with wireless broadband Internet access. Although FIG. 8 shows the WiFi module 970, it may be understood that, the WiFi module 970 is not an essential part of the mobile phone, and may be completely omitted as required without changing the essence of the present application.

The processor 980 is a control center of the mobile phone, and connects various parts of the whole mobile phone by using various interfaces and circuits. By running or executing software programs and/or modules stored in the memory 920 and invoking data stored in the memory 920, the processor 680 performs various functions of the mobile phone and processes data, thereby performing overall monitoring on the mobile phone. Optionally, the processor 980 may include one or more processing units. Preferably, the processor 980 may integrate an application processor and a modulation and demodulation processor, wherein the application processor mainly processes an operating system, a user interface, an application program, and so on, and the modulation and demodulation processor mainly processes wireless communication. It may be understood that, the modulation and demodulation processor may be not integrated into the processor 980.

The mobile phone further includes power supply 990 (such as a battery) for supplying power to various parts. Preferably, the power supply may be logically connected to the processor 980 via a power management system, thereby implementing functions such as charging, discharging, and power consumption management through the power management system.

Although not shown in the figure, the mobile phone may further include a camera, a Bluetooth module, and the like, which are not further described herein.

In the foregoing implementation shown in FIG. 3, the flow at the use equipment side in each act method may be implemented based on the structure of the mobile phone.

In the foregoing implementations shown in FIG. 6 and FIG. 7, the function of each unit may be implemented based on the structure of the mobile phone.

An implementation of the present application further provides a computer readable storage medium. The computer readable storage medium stores a computer program for electronic data interchange, and the computer program causes a computer to execute parts or all of the acts described for the first user equipment in the above method implementations.

An implementation of the present application further provides a computer readable storage medium. The computer readable storage medium stores a computer program for electronic data interchange, and the computer program causes a computer to execute parts or all of the acts described for the second user equipment in the above method implementations.

An implementation of the present application further provides a computer program product. The computer program product includes a non-transitory computer readable storage medium storing a computer program, and the computer program is operable to cause a computer to execute parts or all of the acts described for the first user equipment in the above method. The computer program product may be a software installation package.

An implementation of the present application further provides a computer program product. The computer program product includes a non-transitory computer readable storage medium storing a computer program, and the computer program is operable to cause a computer to execute parts or all of the acts described for the second user equipment in the above method implementations. The computer program product may be a software installation package.

The acts of the method or algorithm described in implementations of the present application may be implemented in hardware, or implemented in a manner of executing software instructions by a processor. The software instructions may be composed by corresponding software modules. The software modules may be stored in a Random Access Memory (RAM), a flash memory, a Read Only Memory (ROM), an Erasable Programmable Read Only Memory (EPROM), an Electrically Erasable Programmable Read Only Memory (EEPROM), a register, a hard disk, a removable hard disk, a Compact Disc Read-Only Memory (CD-ROM), or a storage medium in any other form well-known in the art. An example storage medium is coupled to the processor such that the processor may read information from a storage medium, and write information to the storage medium. Of course, the storage medium may be a component of the processor. The processor and the storage medium may be located in an ASIC. In addition, the ASIC may be located in an access network device, a target network device, or a core network device. Or, the processor and the storage medium may act as separate components in the access network device, the target network device, or the core network device.

Those skilled in the art should realize that in one or more examples described above, the functions described in implementations of the present application may be implemented completely or partly through software, hardware, firmware, or any combination thereof. When the functions are implemented through software, these functions may be implemented completely or partly in the form of a computer program product. The computer program product includes one or more computer instructions. When the computer program instructions are loaded and executed on a computer, the processes or functions are generated completely or partly according to the implementations of the present application. The computer may be a general purpose computer, a special purpose computer, a computer network, or other programmable device. The computer instructions may be stored in a computer-readable storage medium, or transmitted from one computer-readable storage medium to another computer-readable storage medium. For example, the computer instructions may be transmitted from a website site, a computer, a server, or a data center to another website site, computer, server, or data center in a wired mode (e.g., a coaxial cable, an optical fiber, a Digital Subscriber Line (DSL)) or a wireless mode (e.g., infrared radiation, radio, microwave, etc.). The computer-readable storage medium may be any available medium that the computer can access, or a data storage device such as an integrated server or data center that includes one or more available media. The available medium may be a magnetic medium (e.g., a floppy disk, a hard disk, a magnetic tape), an optical medium (e.g., a Digital Video Disc (DVD)), or a semiconductor medium (e.g., a Solid State Disk (SSD)), or the like.

The specific implementations described above further explain in detail the purpose, technical solutions and beneficial effects of implementations of the present application. It should be understood that the above implementations are only the specific implementations of the implementations of the present application and are not used to limit the protection scope of the implementations of the present application. Any modification, equivalent substitution, improvement, etc. made on the basis of the technical solutions of the implementations of the present application shall be included in the protection scope of the implementations of the present application.

What I claim is:

1. A method for data processing, comprising:
   receiving, by a first user equipment, control information from a second user equipment, wherein the control information comprises indication information, wherein the control information comprises Sidelink control information (SCI), and wherein the indication information is defined by using a specific bit in the SCI; and
   determining, by the first user equipment, a transmission mode of data scheduled by the control information according to a value of the specific bit, wherein the value of the specific bit being 0 indicates that the transmission mode of the data scheduled by the control information is a single antenna transmission mode, and wherein the value of the specific bit being 1 indicates that the transmission mode of the data scheduled by the control information is a transmit diversity mode.

2. The method of claim 1, wherein when the second user equipment supports at least one transmit diversity mode, the indication information is defined by using at least one specific bit in the SCI.

3. A method for data processing, comprising:
   configuring, by a second user equipment, control information, wherein the control information comprises indication information, wherein the indication information is used for determining a transmission mode of data scheduled by the control information, and wherein the control information comprises Sidelink control information (SCI), and the indication information is defined by using a specific bit in the SCI; and
   sending, by the second user equipment, the control information to a first user equipment, wherein a value of the specific bit is used for determining the transmission mode of the data scheduled by the control information, wherein the value of the specific bit being 0 indicates that the transmission mode of the data scheduled by the control information is a single antenna transmission mode, and wherein the value of the specific bit being 1 indicates that the transmission mode of the data scheduled by the control information is a transmit diversity mode.

4. The method of claim 3, wherein when the second user equipment supports at least one transmit diversity mode, the indication information is defined by using at least one specific bit in the SCI.

5. A user equipment, comprising a processor connected with a memory, wherein the processor is configured to:
   receive control information from a second user equipment, wherein the control information comprises indication information, and wherein the control information comprises Sidelink control information (SCI), and the indication information is defined by using a specific bit in the SCI; and
   determine a transmission mode of data scheduled by the control information according to a value of the specific bit, wherein the value of the specific bit being 0 indicates that the transmission mode of the data scheduled by the control information is a single antenna transmission mode, and wherein the value of the specific bit being 1 indicates that the transmission mode of the data scheduled by the control information is a transmit diversity mode.

6. The user equipment of claim 5, wherein when the second user equipment supports at least one transmit diversity mode, the indication information is defined by using at least one specific bit in the SCI.

7. A user equipment, comprising a processor connected with a memory, wherein the processor is configured to:

configure control information, wherein the control information comprises indication information, wherein the indication information is used for determining a transmission mode of data scheduled by the control information, wherein the control information comprises Sidelink control information (SCI), and wherein the indication information is defined by using a specific bit in the SCI; and send the control information to a first user equipment, wherein a value of the specific bit is used for determining the transmission mode of the data scheduled by the control information, and the value of the specific bit being 0 indicates that the transmission mode of the data scheduled by the control information is a single antenna transmission mode, and the value of the specific bit being 1 indicates that the transmission mode of the data scheduled by the control information is a transmit diversity mode.

8. The user equipment of claim 7, wherein when the user equipment supports at least one transmit diversity mode, the indication information is defined by using at least one specific bit in the SCI.

* * * * *